United States Patent [19]
Benson et al.

[11] 3,785,206
[45] Jan. 15, 1974

[54] FLUID FLOW MEASURING DEVICE

[75] Inventors: James M. Benson; William C. Baker, both of Hampton, Va.

[73] Assignee: Teledyne, Inc., Los Angeles, Calif.

[22] Filed: Apr. 26, 1972

[21] Appl. No.: 247,841

[52] U.S. Cl. .................................. 73/212, 137/825
[51] Int. Cl. .............................................. G01f 1/00
[58] Field of Search ................. 73/194 R, 212, 189; 137/825, 836

[56] References Cited
UNITED STATES PATENTS
| | | | |
|---|---|---|---|
| 3,343,413 | 9/1967 | South et al. | 73/194 R |
| 3,443,434 | 5/1969 | Baker et al. | 73/202 |
| 3,613,448 | 10/1971 | Benson et al. | 73/205 R |
| 3,705,534 | 5/1972 | Turek | 73/189 |

*Primary Examiner*—Richard C. Queisser
*Assistant Examiner*—John P. Beauchamp
*Attorney*—John W. Malley et al.

[57] ABSTRACT

Apparatus for measuring the velocity of fluid flow includes a form of pitot tube having orifices that develop a differential pressure related to the stream velocity and a means of directing an auxiliary stream of gas at or near one of the orifices. The auxiliary stream is arranged to be deflected by the main stream so that in the range of low velocities of the main stream, wherein pitot tubes are insensitive, the sensitivity of the apparatus is enhanced. In a preferred form of the device, a purged thermal flowmeter connected to the two orifices senses the velocity of the main stream.

8 Claims, 14 Drawing Figures

3,785,206

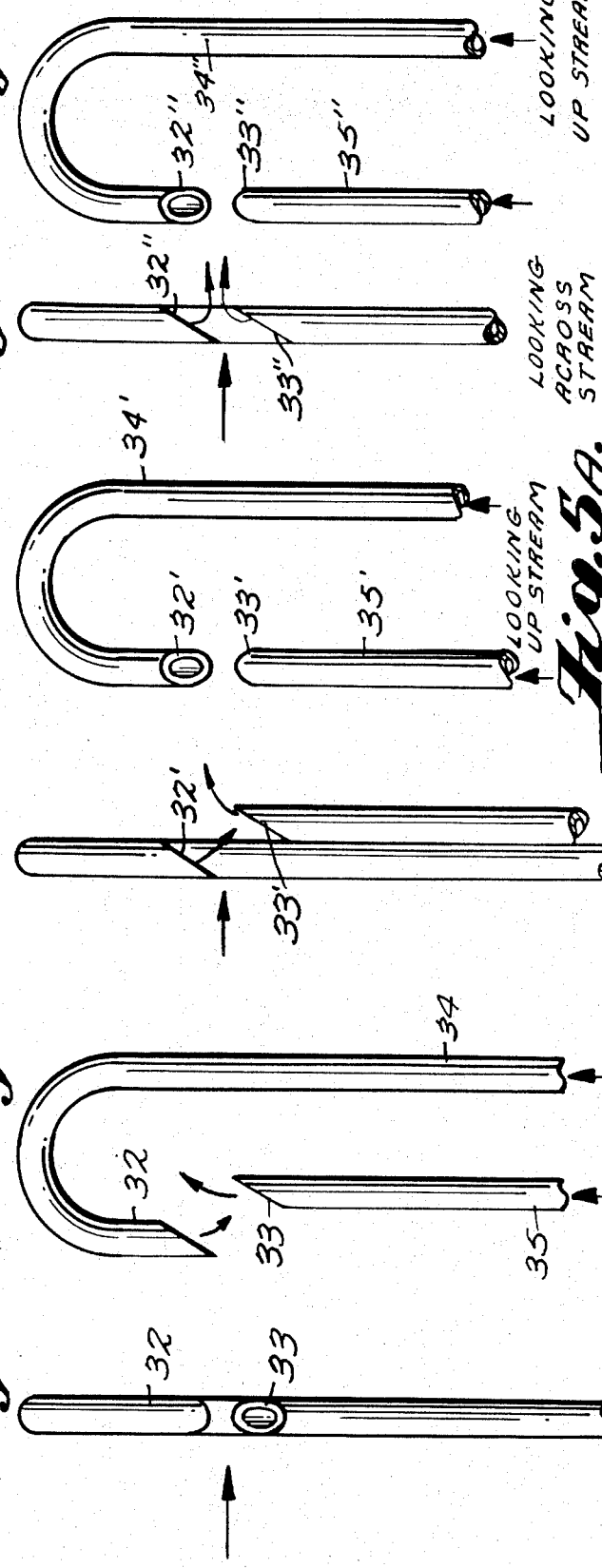

FLUID FLOW MEASURING DEVICE

BACKGROUND OF THE INVENTION

1. Field of the Invention

The present invention is directed to apparatus for measuring fluid flow rates by means of a probe that extends into a test area by, for example, exposing a purged pitot tube with auxiliary jet to the flow in the test area and then operating upon the pressure differential created by velocity head and the auxiliary jet across the pitot tube.

2. Description of the Prior Art

Various forms of the pitot tube have long been used to measure the velocity of a fluid. The usual form of pitot tube, however, suffers from the following two limitations:

a. Its orifices are susceptible to fouling by a contaminated fluid, and
b. It is insensitive to low velocities.

A paper by Tanney entitled "A Linear Fluid Velocity Sensor" and presented to the 1971 Flow Symposium at Pittsburgh, Pennsylvania, as paper No. 2-12-174, describes a fluidic amplifier that depends on the deflection of a jet by a stream that is to be measured. Also, the U. S. Pat. No. 3,343,413 to South and Tanney, issued Sept. 26, 1967, describes similar devices. Like the pitot tube, the devices proposed by Tanney and South have limitations that are particularly severe in certain applications, such as measuring the flow in stacks discharging hot gases laden with corrosive vapors and particulate matter. The destructive vapors and particles may enter the orifices and damage the sensor as well as plug up the passages, thereby rendering the device useless. In the South and Tanney device the sensing orifices are all in a plane normal to the direction of flow in the main stream. At the higher velocities, the auxiliary jet is swept away from the orifices and the device no longer responds meaningfully to the stream velocity.

In the important application of measuring velocities of gases in a stack, it is essential to measure not only the very low velocities so that corrective measures may be initiated to prevent excessive discharge of pollutants into the atmosphere, but also to measure large velocities in order to monitor the excessive discharges that may occur. In addition, the flow sensor should not be damaged or rendered inoperative by contaminants in the stream. These requirements are not all met by either a conventional pitot tube or the fluidic type of sensor described by Tanney and South.

The present invention overcomes these difficulties by employing a form of pitot tube which responds in the usual way at the high velocities and is provided with a fluid jet that enhances the sensitivity at the low velocities where the normal pitot tube is practically useless. Also, a preferred form of the device combines the auxiliary jet with a purging system that prevents contaminating and corrosive material in the main stream from entering the flow sensing system. In another preferred form, a differential flow sensor, such as the thermal flow meter shown as FIG. 1 in U. S. Pat. No. 3,443,434 by Baker and Benson is used. This arrangement responds in a superior way at extremely low rates of flow. A thermal flowmeter with purging, as shown in U. S. Pat. No. 3,613,448 by Benson, et al., is particularly well suited for use in the present invention.

BRIEF DESCRIPTION OF THE DRAWINGS

The preferred embodiments of the invention will now be discussed with reference to the drawings in which:

FIGS. 4A and 4B are, respectively, two views of a different form of pitot tube usable with the above described velocity sensor. FIG. 4A is a view looking downstream and FIG. 4B is a view looking across the main stream;

FIGS. 5A and 5B are, respectively, two views of another form of pitot tube usable with the above described velocity sensor, looking across and up the stream;

FIGS. 6A and 6B are, respectively, views of yet another form of pitot tube usable with the above described velocity sensor.

DETAILED DESCRIPTION OF THE PREFERRED EMBODIMENT

Figure 1:
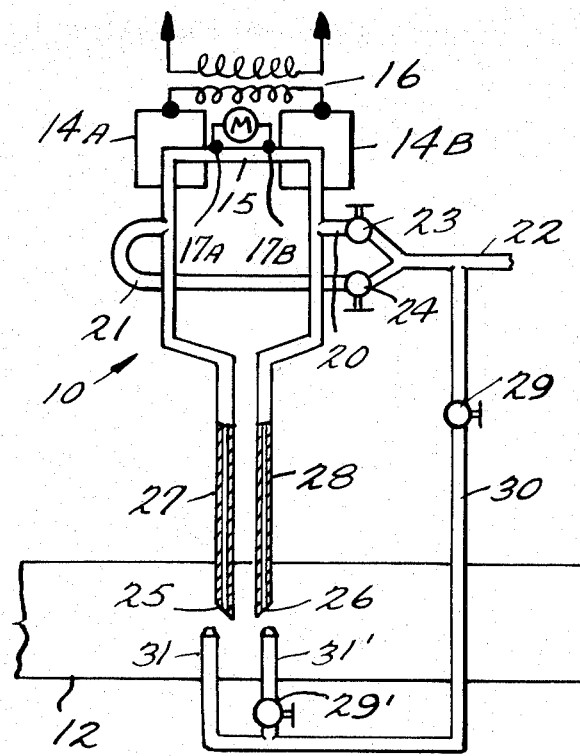
FIG. 1 is a schematic showing of a fluid velocity sensor in accordance with the invention.

Referring especially to FIG. 1, a first arrangement 10 is illustrated for measuring the velocity of fluid in a stack or pipe 12. Of course, this arrangement can also measure fluid velocity in an open space and is not, therefore, restricted to one operative environment.

The arrangement comprises a thermal flowmeter which includes a heated conduit 15 arranged between heat sinks 14A and 14B which are heated from the secondary coil of transformer 16 for heating the fluid flowing thereby and thermoelectric sensors 17A and 17B which are attached to opposite ends of voltmeter M and are arranged in electrical contact with conduit 15 at various positions along the length thereof.

Figure 2:
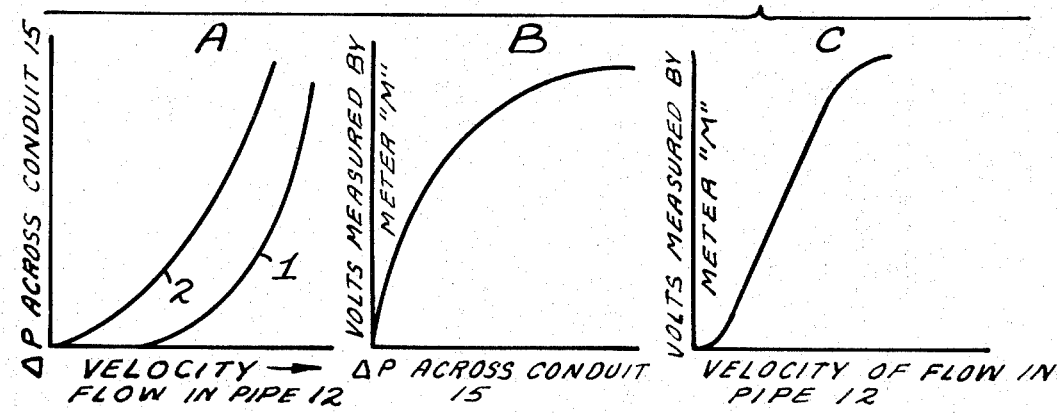
FIGS. 2A, 2B and 2C illustrate the qualitative relations whereby a determination of velocity is achieved by measuring a voltage with meter M.
Figure 3:
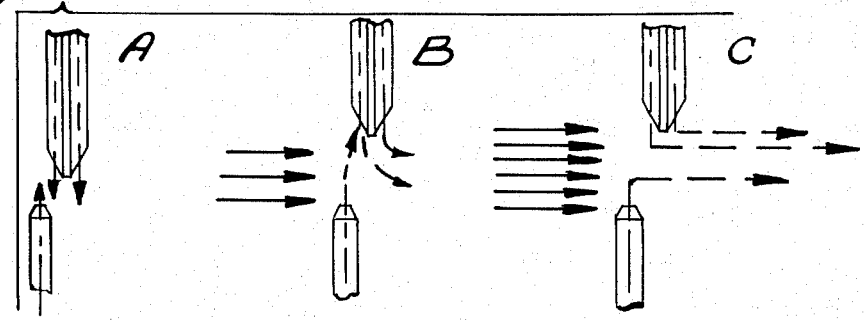
FIGS. 3A, 3B and 3C illustrate different operating states of the device shown in FIG. 1.

The voltage read by voltmeter M varies with the flow through conduit 15 which increases with the pressure difference across conduit 15, as can be seen by reference to FIG. 2B. Since each end of conduit 15 receives a stream of purging gas through inlet conduit 22, and valves 23 and 24 as well as conduits 20 and 21, respectively, which is at a pressure greater than the pressure existing at either orifice, the fluid flowing in pipe 12 never contacts the conduit 15 and therefore fouling of the thermal flowmeter is prevented. The fluid flowing in pipe 12 causes a pressure differential across the two orifices 25 and 26 of the pitot tube which is transferred through conduits 27 and 28, respectively, to conduit 15. As can be seen from curve 1 in FIG. 2A, the differential pressure across conduit 15 varies with the velocity in pipe 12, even without a fluidic amplifier, except in the region of lowest velocity. In such low flow conditions fluidic amplification is desirable and this is achieved by the arrangement 10 through the use of valve 29, conduit 30 and auxiliary nozzle 31 to transfer some purging fluid from inlet 22 to a region adjacent to the dynamic head 25 of the pitot tube. When absolutely zero flow exists in pipe 12 as shown in FIG. 3A, there is no pressure differential across the two orifices 25 and 26, respectively, since the auxiliary jet 31 is not in alignment with either head. However, whenever there is even a small flow of fluid in pipe 12 as in FIG. 3B, this flow detects the fluid issuing from jet 31 into orifice 25 to thereby increase the differential pressure between orifices 25 and 26 over that caused solely by the stream.

When the flow in pipe 12 exceeds some given value, fluid issuing from auxiliary jet 31 is deflected past both orifices 25 and 26, as shown in FIG. 3C, whereby only the differential pressure created by the flow in pipe 12 itself is registered. Thus, a flow-dependent relationship is achieved even at low velocities with fluidic amplification, as can be seen from curve 2 in FIG. 2A. When the response of the purged pitot tube and fluidic amplification as shown in curve 2 in FIG. 2A is combined with the response of the thermal flowmeter as shown in FIG. 2B, the resultant output is approximately linear over an appreciable range, as shown in FIG. 2C; hence the meter M can be calibrated to read directly in terms of velocity of fluid flow in pipe 12.

This arrangement would not work well if the direction of flow in pipe 12 were reversed since the auxiliary jet would be deflected away from orifice 25 even for small flows. It should be noted that a second auxiliary jet 31' can be placed on the opposite side of orifice 26 so that if the direction of flow in pipe 12 is reversed, a fluidic amplification is then possible with the flow reversed. The flow in the jet 31' can be regulated by a valve 29'.

Figure 7:
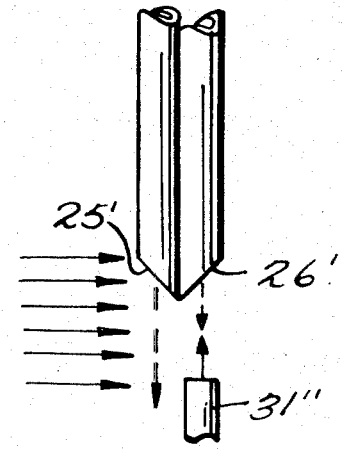
FIG. 7 shows a side view of another arrangement of the pitot tube and auxiliary jet similar to that of FIG. 1.

An auxiliary jet may be placed directly opposite and aimed at orifice 26' as shown in FIG. 7 so that under no flow conditions the discharge of purging fluid from head 26' is impeded, causing an arbitrary differential pressure across the pitot tube orifices and conduit 15, but at greater flow velocities the stream of fluid issuing from the auxiliary jet is deflected away from head 26, reducing its impeding effect and thus enhancing the differential pressure across the orifices.

A further series of modified pitot tubes dispenses with the need for an auxiliary jet. For example, referring to FIGS. 4A and 4B, orifices 32 and 33 are so arranged that purging fluid issuing from 32 is deflected by low velocity fluid flow toward orifice 33, thus enhancing the differential pressure produced by flow across orifices 32 and 33. This arrangement would not work well if the direction of flow were reversed since the shaft 34 would shield orifice 32 from flow.

To overcome this problem, an improved version of the arrangement of FIGS. 4A and 4B is presented in FIGS. 5A and 5B.

As can best be seen in FIG. 5B, orifice 33' develops a positive pressure while orifice 32' develops a lower pressure if the direction of fluid flow is from the left to the right. The purging fluid issuing from orifice 32' being deflected by the stream impedes the discharge of purging fluid from 33' to enhance the differential pressure between the two orifices. If, however, the direction of flow in pipe 12 is reversed, orifice 32' becomes the positive pressure orifice and is exposed to the stream without obstruction from the supporting conduit 34'.

The FIGS. 6A and 6B present yet another arrangement of a pitot tube. The important difference between the arrangement of FIGS. 5A and 5B and the arrangement of FIGS. 6A and 6B is that in the latter case the orifices 32'' and 33'' are in axial alignment. Thus, in the complete absence of flow, the purging gas issuing from each tube opposes the gas issuing from the other tube, but when fluid flows at low velocity as shown in FIG. 6B both purging streams are deflected. Thus, the arrangement of FIGS. 6A and 6B also operates to amplify the effect of a low velocity fluid flow upon the orifices 32'' and 33''.

While the above description covers the preferred embodiments, many modifications are possible possible within the scope of the invention. Thus, reference should be made to the following claims for a complete understanding of the scope of the invention.

What is claimes is:

1. Apparatus for measuring fluid flow through a supply line, comprising:
   a. means including a pair of orifices within said line for developing a differential pressure thereacross in response to flow through the supply line;
   b. a shunt path bridging said orifices;
   c. a flowmeter connected to said shunt path;
   d. means for supplying purging fluid to said shunt path at points on opposite sides of the flowmeter; and
   e. means for amplifying the differential pressure developed by said developing means only when there is fluid flow through said supply line below a predetermined level, said amplifying means including means for introducing said purging fluid into the supply line in relationship to said orifices such that said purging fluid is directed at one of said orifices only when there is fluid flow through the supply line below said predetermined level.

2. Apparatus for measuring fluid flow as set forth in claim 1, wherein said differential pressure developing means comprises a pitot tube and wherein the amplifying means includes an auxiliary jet of purging fluid introduced into said supply line upstream of the pitot tube.

3. Apparatus for measuring fluid flow as set forth in claim 2, further comprising an additional auxiliary jet of fluid introduced into said supply line downstream of the pitot tube to permit apparatus to function when the direction of fluid flow in the supply line is reversed.

4. Apparatus for measuring fluid flow as set forth in claim 1, wherein said purging fluid is supplied to the shunt path at a pressure greater than that at either orifice whereby contact between the fluid in the supply line and the flowmeter is prevented.

5. Apparatus for measuring fluid flow as set forth in claim 4, wherein said differential pressure developing means comprises a pitot tube and wherein the amplifying means includes an auxiliary jet of purging fluid introduced into said supply line normal to the path of flow in the supply line and directed towards the downstream orifice of the pitot tube.

6. Apparatus for measuring fluid flow as set forth in claim 1, wherein said differential pressure developing means comprises a pitot tube having its orifices in facing relationship and wherein the purging fluid is supplied to the shunt path at a pressure greater than that at either orifice so as to cause purging fluid to issue from said orifices.

7. Apparatus for measuring fluid flow as set forth in claim 6, wherein said orifices are in alignment along an axis normal to the direction of fluid flow in the supply line.

8. Apparatus for measuring fluid flow as set forth in claim 6, wherein the axes of said orifices define a plane extending in the direction of fluid flow in the supply line.

* * * * *